United States Patent
Pfoltner et al.

(10) Patent No.: US 9,751,089 B2
(45) Date of Patent: Sep. 5, 2017

(54) WEAR-RESISTANT CUTTING TEETH, CUTTING HEADS AND RELATED APPARATUS

(71) Applicant: Vermeer Manufacturing Company, Pella, IA (US)

(72) Inventors: Chris Pfoltner, Knoxville, IA (US); Clint Weinberg, Pella, IA (US); John Maher, Pleasant Hill, IA (US); Steve Van Zee, Pella, IA (US)

(73) Assignee: VERMEER MANUFACUTURING COMPANY, Pella, IA (US)

( * ) Notice: Subject to any disclaimer, the term of this patent is extended or adjusted under 35 U.S.C. 154(b) by 481 days.

(21) Appl. No.: 14/369,508

(22) PCT Filed: Jan. 10, 2013

(86) PCT No.: PCT/US2013/021018
§ 371 (c)(1),
(2) Date: Jun. 27, 2014

(87) PCT Pub. No.: WO2013/106560
PCT Pub. Date: Jul. 18, 2013

(65) Prior Publication Data
US 2015/0014458 A1    Jan. 15, 2015

Related U.S. Application Data

(60) Provisional application No. 61/585,501, filed on Jan. 11, 2012.

(51) Int. Cl.
*B02C 18/18* (2006.01)
*A01B 33/10* (2006.01)
*A01G 23/00* (2006.01)
*B02C 18/06* (2006.01)
*B23K 26/342* (2014.01)

(52) U.S. Cl.
CPC ............ *B02C 18/18* (2013.01); *A01B 33/103* (2013.01); *A01G 23/00* (2013.01); *B02C 18/06* (2013.01); *B23K 26/342* (2015.10)

(58) Field of Classification Search
CPC ....... B02C 18/18; B02C 18/06; B23K 26/342; A01G 23/00; A01B 33/103
See application file for complete search history.

(56) References Cited

U.S. PATENT DOCUMENTS 2,867,137 A    1/1959    Joy
4,219,291 A *  8/1980    Hoeh .................... B02C 18/182
                                                            241/236
4,303,137 A    12/1981   Fischer
(Continued)

FOREIGN PATENT DOCUMENTS

WO    2006024019 A1    3/2006
WO    2008143891 A2    11/2008

OTHER PUBLICATIONS

International Search Report and Written Opinion, Application No. PCT/US2013/021018, dated Apr. 30, 2013, pp. 12.

*Primary Examiner* — Mark Rosenbaum
(74) *Attorney, Agent, or Firm* — Armstrong Teasdale LLP

(57) ABSTRACT

Apparatus for mulching organic matter such as brush and trees are disclosed. The apparatus have cutting teeth that include cladding for increasing the wear-resistance of the teeth. Cutting heads and vehicles that incorporate such teeth are also disclosed.

20 Claims, 10 Drawing Sheets

(56) References Cited

U.S. PATENT DOCUMENTS

| | | | |
|---|---|---|---|
| 4,901,929 A | * | 2/1990 | Barclay ................. B02C 18/142 241/236 |
| 4,938,012 A | | 7/1990 | Klima |
| 5,692,689 A | | 12/1997 | Shinn |
| 6,146,476 A | | 11/2000 | Boyer |
| 6,269,559 B1 | | 8/2001 | Edwards |
| 6,402,438 B1 | | 6/2002 | Boyer |
| 6,451,152 B1 | | 9/2002 | Holmes et al. |
| 6,764,035 B2 | | 7/2004 | Denis et al. |
| 7,166,371 B2 | | 1/2007 | Lakhotkin et al. |
| 7,231,713 B2 | | 6/2007 | Boegli et al. |
| 7,401,537 B1 | | 7/2008 | Krauter |
| 7,632,175 B2 | | 12/2009 | Freyvogel |
| 7,677,843 B2 | | 3/2010 | Techel et al. |
| 7,810,531 B2 | | 10/2010 | Labbe |
| 7,967,044 B2 | | 6/2011 | Labbe et al. |
| 2003/0101706 A1 | | 6/2003 | Kenny |
| 2003/0145716 A1 | | 8/2003 | Dixon |
| 2006/0169679 A1 | | 8/2006 | Sato et al. |
| 2008/0298909 A1 | | 12/2008 | Gaudreault |
| 2009/0026183 A1 | | 1/2009 | Rose |

* cited by examiner

WEAR-RESISTANT CUTTING TEETH, CUTTING HEADS AND RELATED APPARATUS

CROSS-REFERENCE TO RELATED APPLICATION

This application claims the benefit of U.S. Provisional Application No. 61/585,501, filed Jan. 11, 2012, which is incorporated herein by reference in its entirety.

FIELD OF THE DISCLOSURE

The field of the disclosure relates to apparatus for mulching and clearing organic matter such as brush, trees and tree limbs. In particular embodiments, the field of the disclosure relates to cutting teeth used in such apparatus that include cladding for increasing the wear-resistance of the teeth, and to cutting heads and vehicles that incorporate such teeth.

BACKGROUND

Clearing of brush and other organic matter typically involves use of heavy-duty self-propelled mulchers (which may also be referred to by those of skill in the art as "forestry mowers"). Such mulchers include a cutting head with cutting teeth secured thereto that rotates at high speeds to cut or shred the organic material. The cutting head may be mounted to any one of a number of vehicles for manipulating the cutting head. For example, the cutting head may be attached to a skid steer, excavator, backhoe, grader or dedicated prime mover which assists in positioning the cutting head toward the organic material and which may also drive rotation of the cutting head.

During use of the mulching apparatus, the cutting teeth wear and become less sharp, and the apparatus becomes less efficient and effective in clearing material. The teeth must be periodically sharpened while attached to the apparatus or even removed from the cutting head and sharpened. After a period of use, the cutting teeth must be replaced with previously sharpened teeth. These re-sharpening and/or replacement operations result in costly device downtime and increased cost.

A continuing need exists for cutting teeth that are more resistant to wear during use and to cutting heads and propelled mulching apparatus that include such teeth.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a cutting tooth for a mulching tool. The cutting tooth includes a substrate having a cutting edge formed on the substrate. A wear-resistant bead is fused to the substrate. The wear-resistant bead extends parallel along the cutting edge. The substrate and wear-resistant bead have different compositions.

Another aspect of the present disclosure is directed to a cutting head for mulching organic matter. The cutting head includes a cylindrical drum adapted for rotation about an axis. One or more cutting teeth are attached to the drum for shredding organic matter upon rotation of the drum. The teeth include a substrate having a cutting edge formed on the substrate and a wear-resistant bead fused to the substrate. The substrate and wear-resistant bead have different compositions.

Yet a further aspect of the present disclosure is directed to a propelled apparatus for mulching organic matter. The propelled apparatus includes a propulsion mechanism and a cutting head attached to the propulsion mechanism. The cutting head has a cutting tooth for cutting organic matter. The cutting tooth includes a substrate having a cutting edge formed on the substrate and a wear-resistant bead fused to the substrate. The substrate and wear-resistant bead have different compositions.

Yet another aspect of the present disclosure is directed to a method for producing a cutting tooth for a mulching tool. The cutting tooth has a substrate having a cutting edge formed on the substrate and a bead that extends parallel along the cutting edge. A laser diode is activated to melt wear-resistant material. At least one of the laser diode and substrate is moved such that molten wear-resistant material is deposited parallel along the cutting edge. The molten material solidifies to form a wear-resistant bead fused to the substrate parallel along the cutting edge.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
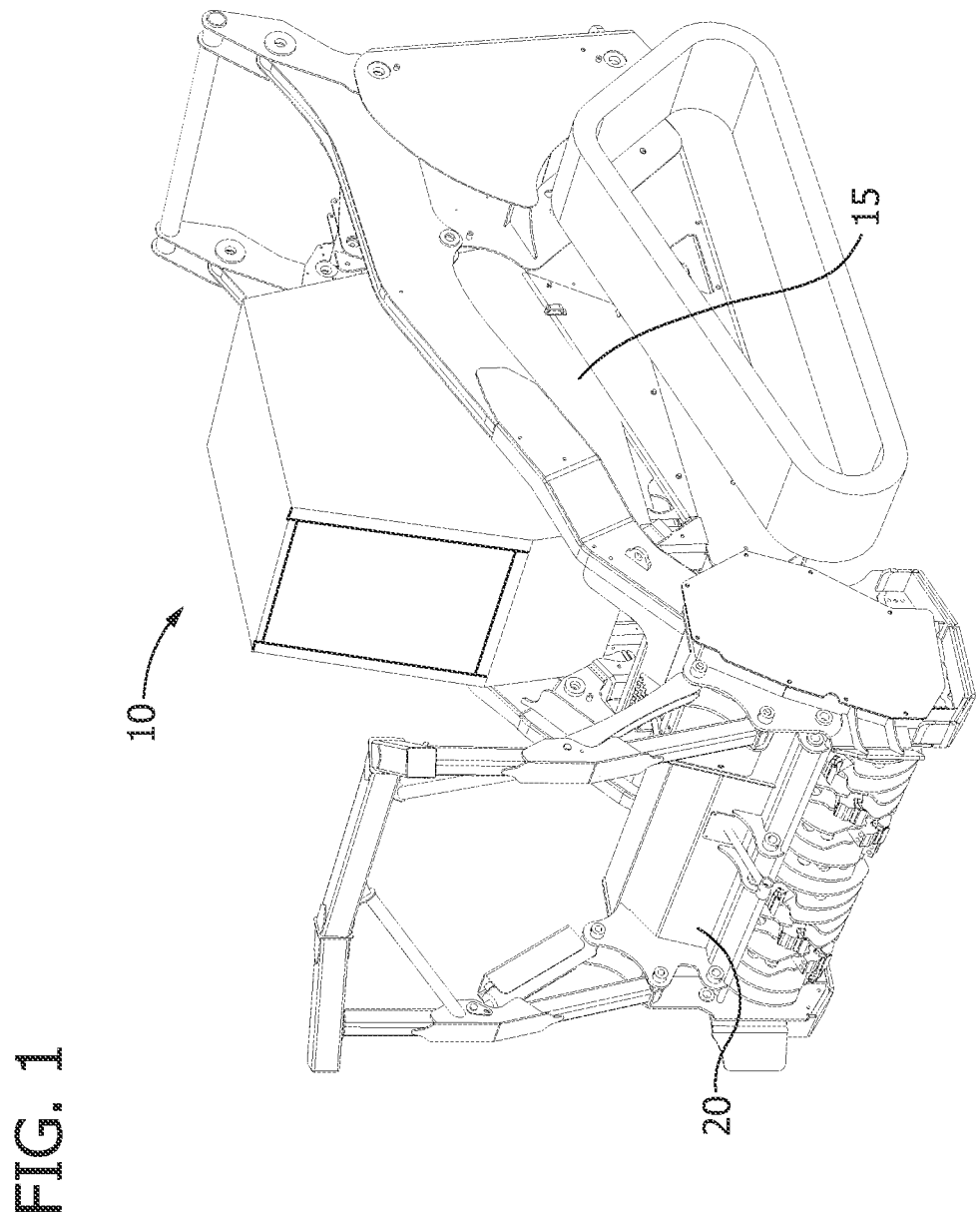
FIG. 1 is a perspective view of a propelled mulching apparatus.

Referring to FIG. 1, a mulching apparatus 10 (which may be referred to below as a "mulching tool") that is driven by a skid steer 15 is shown. The mulching apparatus 10 may also be driven by vehicles or propulsion mechanisms other than skid steers such as excavators, backhoes, graders or dedicated prime movers. In this regard, the principles described herein relating to the skid steer 15 are also applicable to other types of mechanisms or vehicles.

Figure 3:
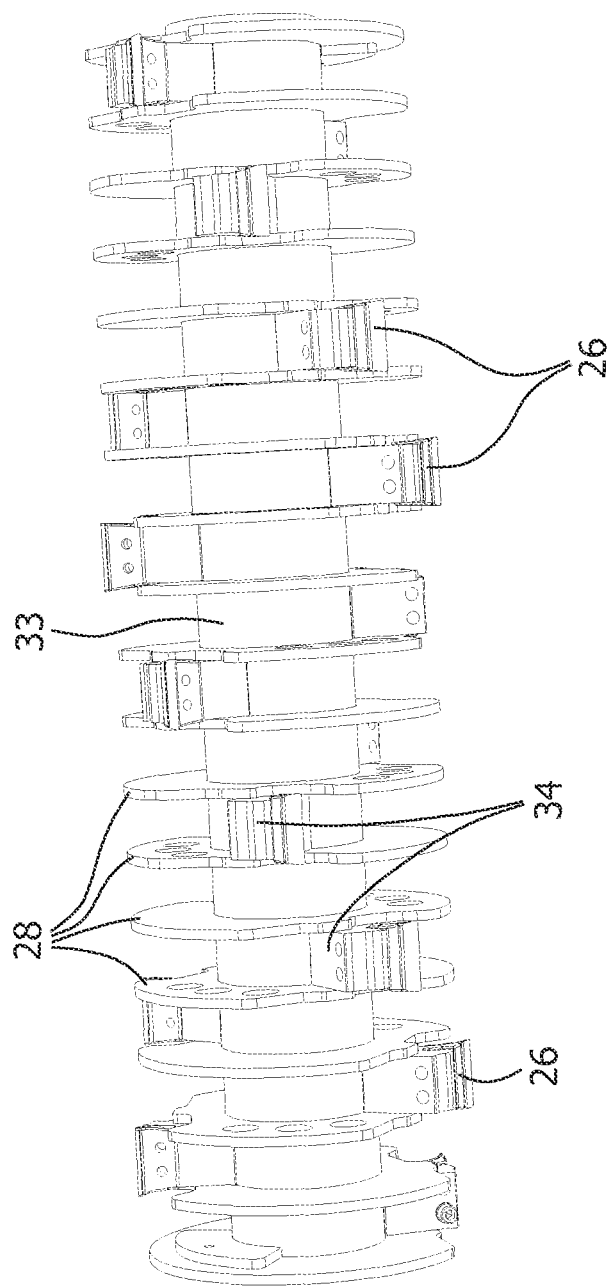
FIG. 3 is a front view of a rotor assembly of the cutting head.

The mulching apparatus 10 includes a cutting head 20 that is releasably attached to the skid steer 15 such as by any of the known methods available to those of skill in the art. Allowing the cutting head 20 to be releasably attached also allows the skid steer 15 to be used for applications other than mulching. The propulsion mechanism (i.e., skid steer 15 as shown in FIG. 1) optionally includes one or more hydraulic motors (not shown) for lowering and/or raising the cutting head 20 and for rotation of the rotor assembly (FIG. 3).

Figure 2:
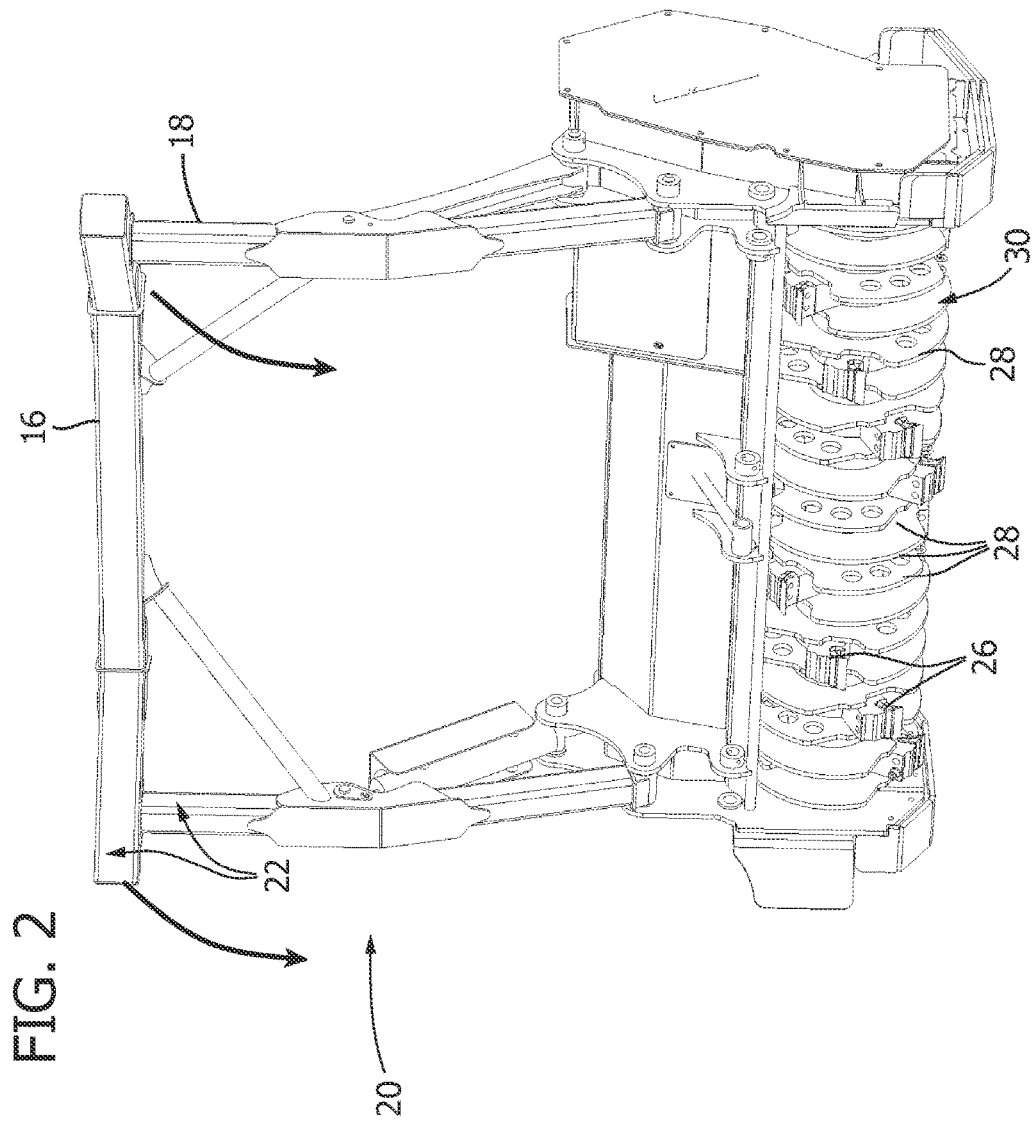
FIG. 2 is a perspective view of a cutting head of the propelled mulching apparatus.

The cutting head 20 is shown in FIG. 2 separated from the skid steer. In this embodiment, the cutting head 20 includes a brush control assembly 22 that is used to push brush outward away from the mulching apparatus (as indicated by arrows) and allows the organic matter to be better exposed to the rotor assembly 30. The brush control assembly 22 includes a brush bar 16 for engaging the brush and brush bar supports 18. The brush control assembly 22 may be raised and lowered by use of separate controls (e.g., hydraulics). In other embodiments, the cutting head 20 does not include a brush control assembly 22.

The cutting head 20 includes a rotor assembly 30 that rotates to cause cutting/mulching as further described below. The cutting head 20 may include a series of pulleys and belts (not shown) for rotating the rotor assembly 30. Rotation may be driven by hydraulics or by power-take-off (PTO) systems or any other suitable method available to those of skill in the art. The rotor assembly 30 (FIG. 3) includes a cylindrical drum 33 that is adapted for rotation about an axis and a number of disks 28 attached to the drum.

It should be noted that the term "drum" as used herein is not intended to imply any particular dimensions or shape and should not be considered in a limiting sense. Generally any implement that partially extends over the length of the cutting head to which one or more teeth are directly or indirectly attached may be considered a "drum" unless stated otherwise herein. The drum 33 may be hollow or filled. Further, the drum 33 may include several parts or portions that are combined so as to form a unit that operates about an axis. In other embodiments, the rotor assembly 30 does not include disks or the disks are arranged other than as shown in FIG. 3.

The disks 28 have several cut-out portions formed along the peripheral edge of the disks to promote removal of material from the rotor assembly 30. The disks 28 also have several openings formed therein which help balance the rotor assembly 30.

Figure 4:
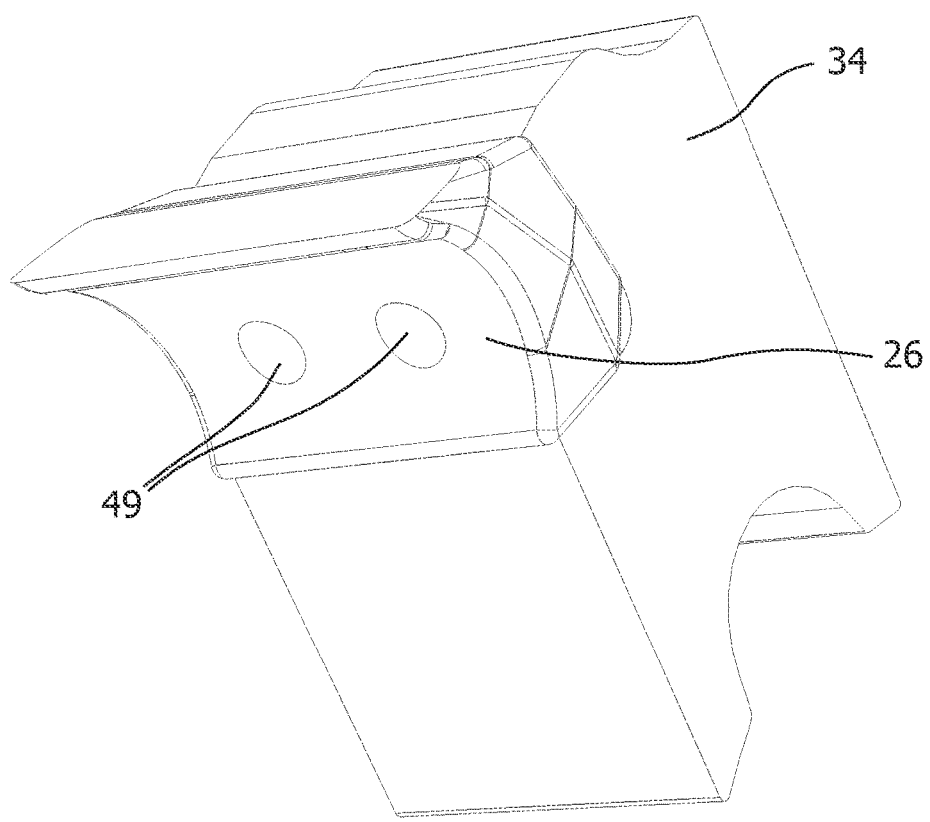
FIG. 4 is a perspective view of a cutting tooth and mounting block.

A number of mounting blocks 34 are attached to the drum 33 between adjacent disks 28. A cutting tooth 26 is releasably attached to each mounting block 34. The cutting tooth 26 (FIG. 4) and mounting block 34 each have two openings formed therein for bolting the tooth to the mounting block. Tooth openings 49 may be threaded and the openings in the mounting block (not shown) may be through-holes for a bolt to pass through to secure the teeth. Teeth 26 may be otherwise attached to the mounting blocks 34 such as by any method known to those of skill in the art.

During use of the mulching apparatus and after one or more teeth 26 have worn, the worn teeth may be disconnected from the mounting block 34 and replaced with sharpened teeth 26. Alternatively the teeth 26 may be sharpened while attached to the mounting block 34. In some embodiments, the mounting block 34 is eliminated and the teeth 26 are attached directly to the drum 33.

The cutting head 20 (FIG. 2) may include one or more shear bars (not shown). The shear bar and cutting edge of the teeth are aligned and adjacent such that, during rotation of the drum, organic matter becomes trapped between the tooth and shear bar causing the material (e.g., small material like branches and brush) to be shredded. The shear bar also acts to clear material from the teeth 26. Some organic material may also be shredded before contact with the shear bar (e.g., stationary material such as larger trees and stumps which are secured in the ground). The cutting head 20 may also include one or more protective teeth guards (not shown).

The teeth 26 are arranged on the drum 33 such that the teeth "spiral" around the drum 33. This allows only several or even one tooth 26 to engage material at one time which assists in mulching and lessens stresses on the rotor assembly 30. Teeth arrangements (e.g., lengthwise spacing, circumferential spacing, number of teeth and the like) other than as shown in FIGS. 1-3 may be used without departing from the scope of the present disclosure. Typically the cutting head includes a plurality of teeth such as at least about 5 teeth, at least about 10 teeth or even at least about 15 teeth.

Figure 5:
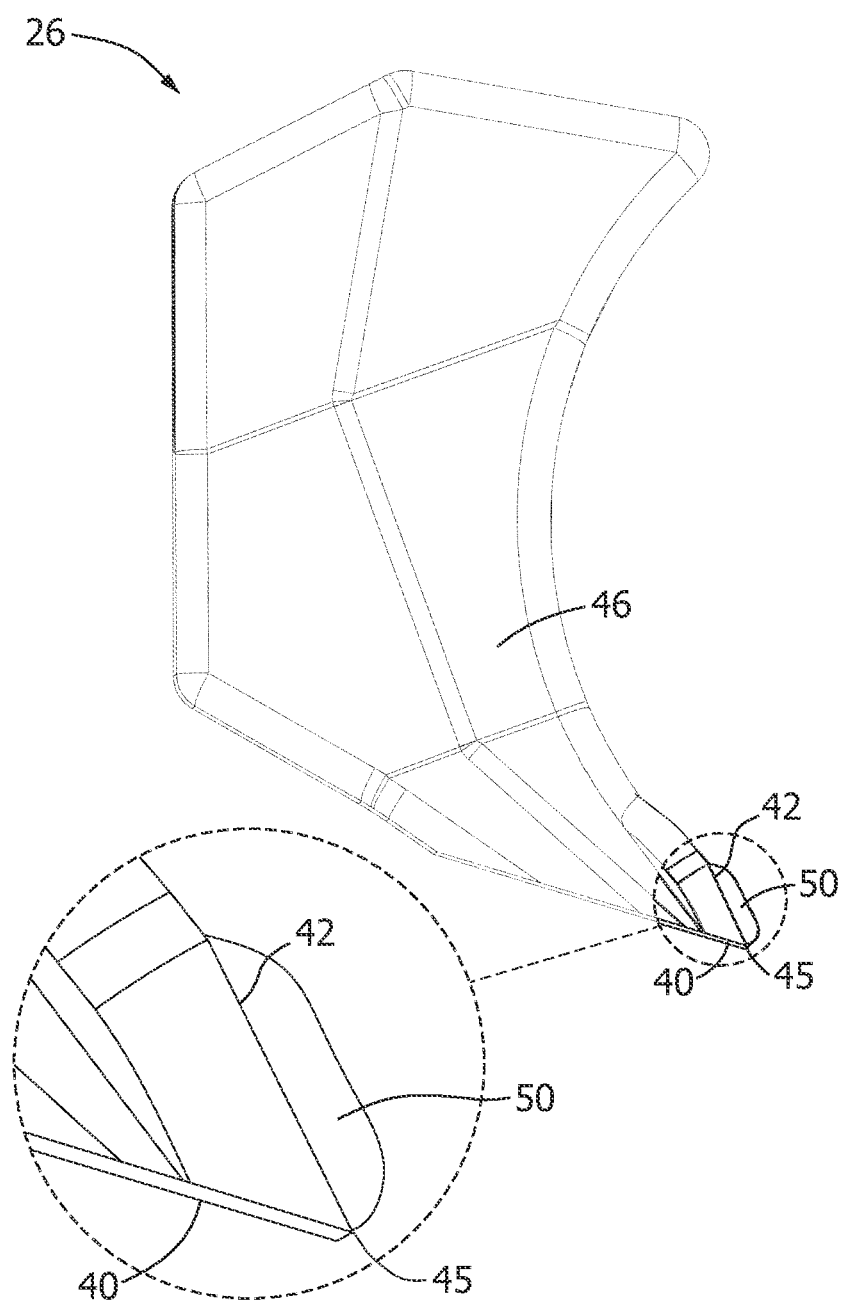
FIG. 5 is a side view of a cutting tooth.

An exemplary cutting tooth 26 for use in a mulching apparatus is shown in FIG. 5. The tooth 26 includes a substrate 46 having a number of surfaces including a first surface 40 and a second surface 42. The first surface 40 and second surface 42 angle toward one another to form a cutting edge 45 at the end of the first and second surfaces. A bead 50 of material is fused to the substrate 46 along the cutting edge 45 to improve the wear-resistance of the tooth 26. Generally, the substrate 46 and bead 50 have different compositions (i.e., are made of different materials or contain the same materials but in different amounts). In some embodiments, the bead 50 includes a material that is more resistant to wear relative to the substrate 46. It should be noted that the bead 50 in FIGS. 5-9 is not drawn to scale. The bead 50 may be relatively flat and thin as described below.

Figure 7:
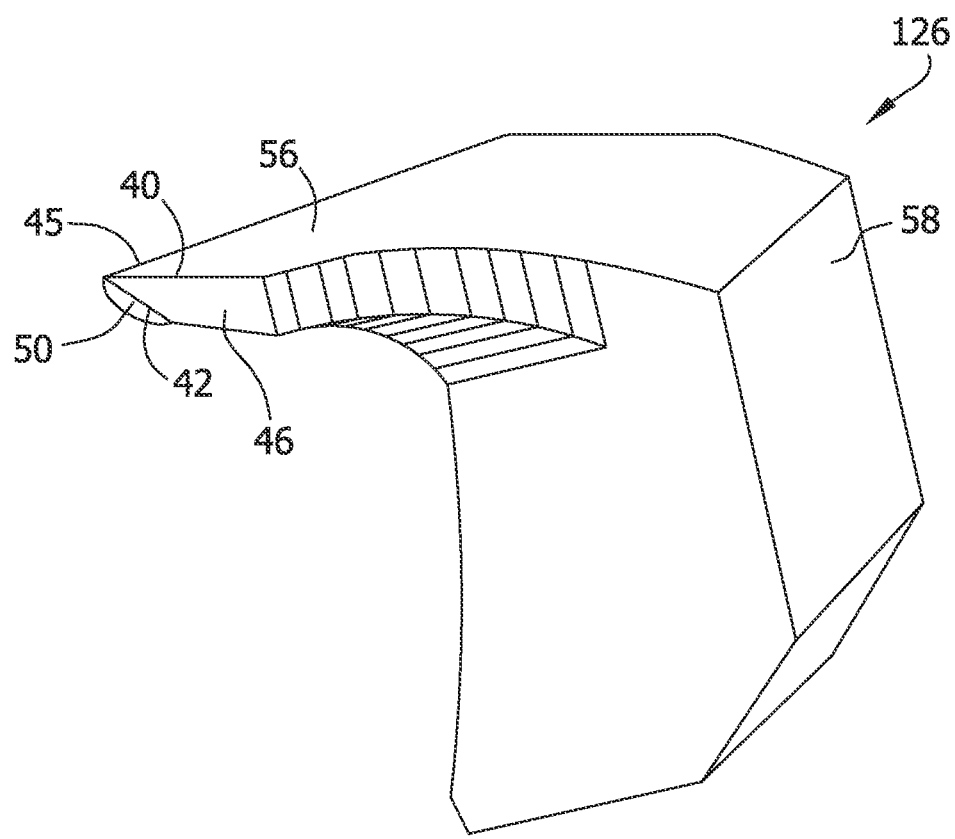
FIG. 7 is a perspective view of a cutting tooth.
Figure 8:
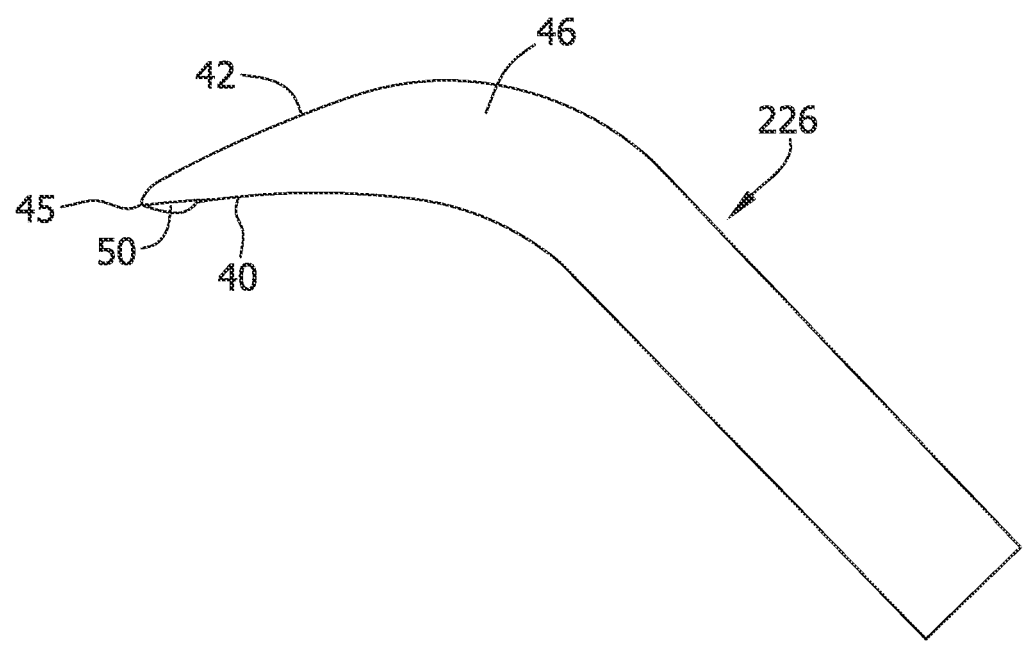
FIG. 8 is a side view of a cutting tooth.
Figure 9:
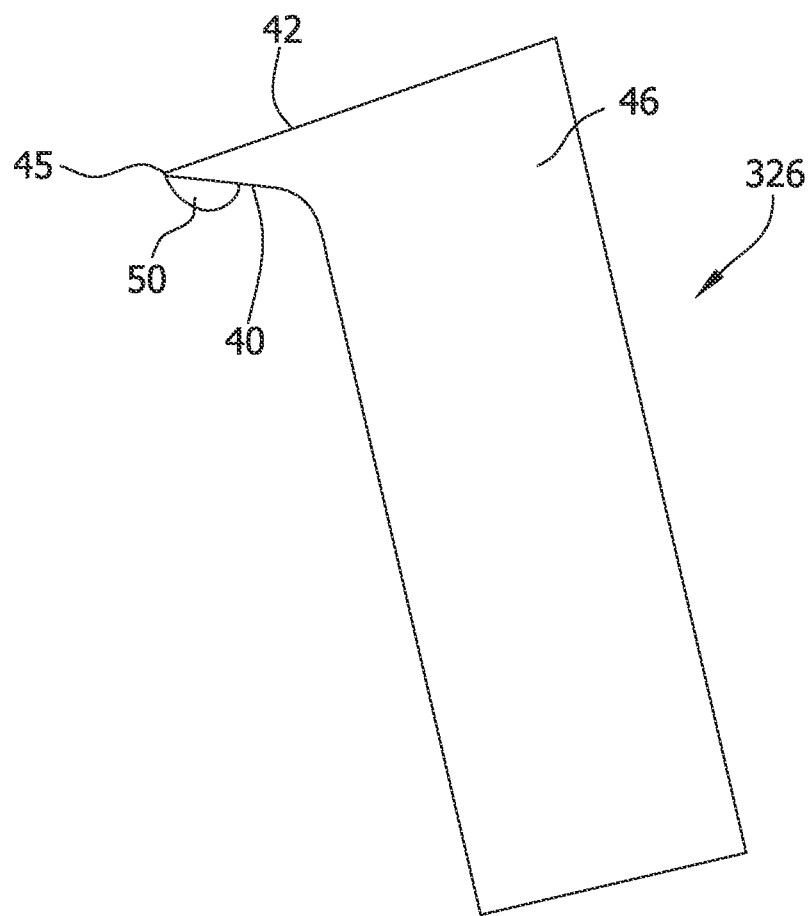
FIG. 9 is a side view of a cutting tooth.
Figure 10:
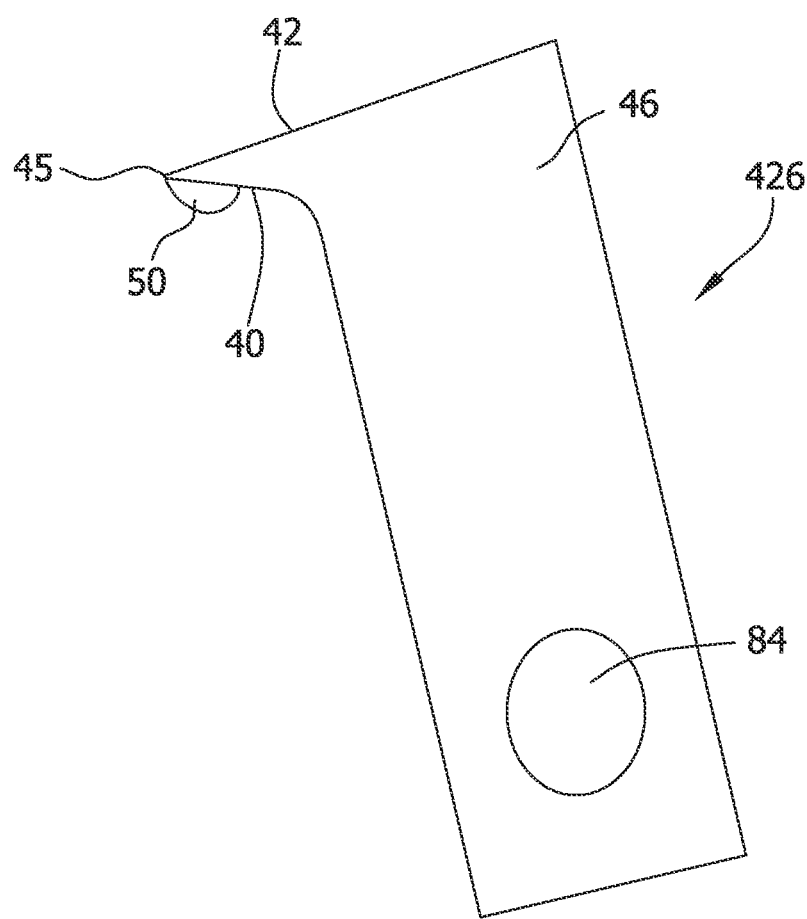
FIG. 10 is a side view of a cutting tooth.

The bead 50 may be fused to the leading surface of the substrate 46 (i.e., the surface which first engages material during operation designated as 42 in FIGS. 5 and 7 and as 40 in FIGS. 8-10). In other embodiments, the bead 50 is fused to the trailing surface (i.e., surface 40 in FIGS. 5 and 7 and surface 42 in FIGS. 8-10) or may be fused to both the leading surface and trailing surface to impart wear-resistance.

Figure 6:
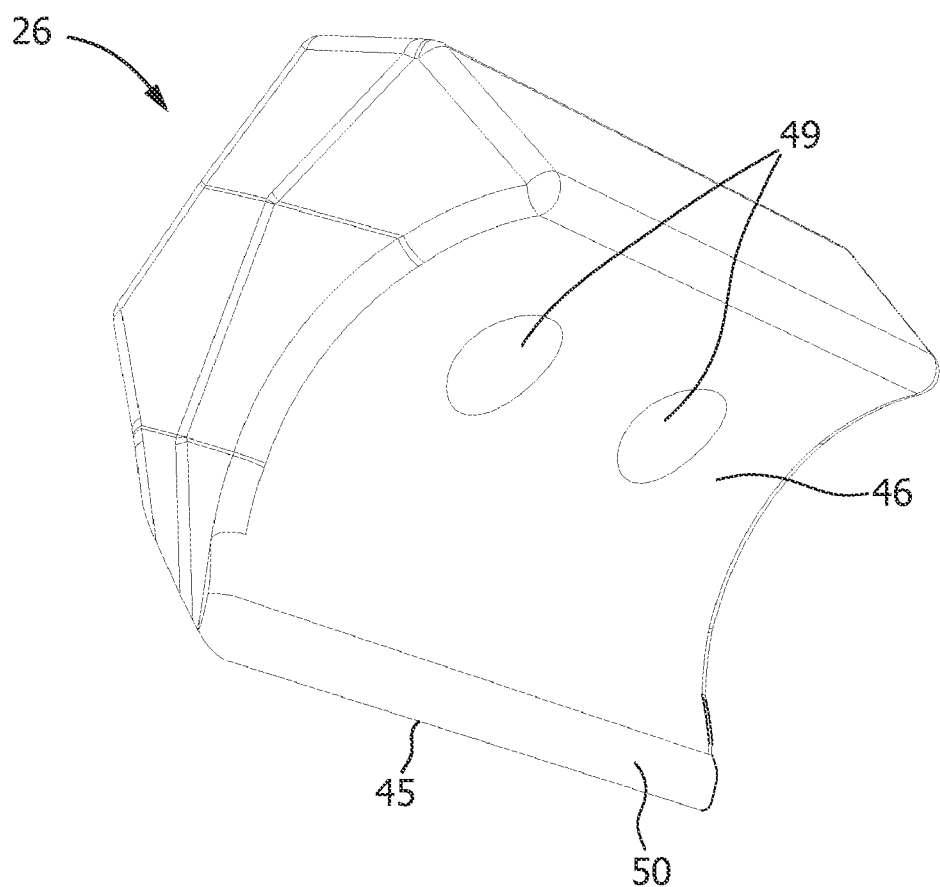
FIG. 6 is a perspective view of a cutting tooth.

Referring now to FIG. 6, the wear-resistant bead 50 is unitary and continuous, and extends along the cutting edge 45 and generally parallel to the cutting edge. This parallel orientation (as opposed to a transverse or partially transverse orientation or to a multi-piece arrangement) prevents chipping and serration of the bead or the cutting edge 45 of the tooth 26. During use, the cutting edge 45 of the tooth wears (i.e., becomes less sharp). The tooth 26 of this embodiment with the wear-resistant bead 50 is able to maintain an acceptable sharpness for longer periods of time. This reduces the amount of downtime involved in replacing worn teeth with sharpened teeth. For example, the mulching apparatus may be used for at least about 25 hours or more before the teeth have worn to a degree that the mulching apparatus does not operate effectively or, as in other embodiments, at least about 50 hours or more or even at least about 75 hours or more.

The tooth 26 of this embodiment includes only one wear-resistant bead 50 fused to the substrate 46 (i.e., the wear-resistant material is applied in one welding pass). However in other embodiments, the tooth 26 may include more than one wear-resistant bead 50 along the cutting edge 45.

During use of the mulching apparatus, the starting cutting edge may wear away which causes a new cutting edge (not shown) to continually form. After a period of use, the new edge may be defined by the substrate 46, the bead 50 or a combination of the substrate and bead. In some embodiments, the bead 50 and substrate 46 wear at different rates which allows the tooth 26 to be self-sharpening.

As shown in the embodiment of FIG. 6, the wear-resistant bead 50 is fused to the substrate at the cutting edge 45 (e.g., the bead 50 at least partially covers the cutting edge 45). However, the bead 50 may also be spaced from the cutting edge 45. In such embodiments, the edge 45 may wear away toward the bead during operation and may wear into the bead 50 after repeated use. In other embodiments, the bead 50 extends past the edge 45 of the substrate 46 and the bead itself forms the cutting edge. The tooth 26 has mounting openings 49 for securing the tooth to the mounting block 34.

Typically the bead 50 is fused to the substrate 46 (i.e., the bead is metallurgically bonded rather than merely adhered to the substrate such as by thermal spraying). In this embodiment, the bead 50 is fused by welding.

In some embodiments, the bead 50 is welded to the substrate 46 by a laser cladding process and, in particular, by laser cladding that uses a laser diode. Such methods involve introducing a wear-resistant material (e.g., tungsten carbide) to the substrate near an activated laser diode which melts the wear-resistant material on the substrate. At least one of the laser diode and substrate is moved such that molten wear-resistant material is deposited parallel along the cutting edge of the substrate. The molten material solidifies to form a wear-resistant bead 50 that is fused to the substrate 46. The substrate 46 may be pre-heated prior to the laser cladding process.

Laser diode cladding processes produce a relatively uniform and continuous bead 50 on the substrate 46 that is also relatively wide. Such wide beads 50 help prevent the cutting edge from becoming serrated which increases the wear of the tooth. Further, relatively wide beads 50 are more economical relative to multiple narrower beads and allow the tooth 26 to wear more before being replaced. Such laser diode clad beads 50 may also be relatively thin which allows the tooth to maintain a sharper edge and results in reduced drag during operation. Further, such thin beads 50 allow the amount of cladding to be reduced. In some embodiments, the ratio of bead width to thickness is at least about 5 to 1 or, as in other embodiments, at least about 10 to 1 or even at least about 25 to 1. The average width of the bead 50 may be at least about 2.5 mm, at least about 7.5 mm or even at least about 10 mm (e.g., from about 2.5 mm to about 15 mm). The average thickness of the bead 50 may be less than about 3 mm, less than about 2 mm, less than about 1 mm or less than about 0.5 mm (e.g., from about 0.1 mm to about 2.5 mm or from about 0.1 mm to about 1 mm).

The wear-resistant material used to form the bead 50 may be in a granular form prior to and during the laser cladding process. In some embodiments, the average size of the wear-resistant material used during laser cladding ranges from about 10 μm to about 500 um or, as in other embodiments, from about 25 um to about 500 um, from about 50 um to about 500 um, from about 50 um to about 250 um, from about 50 um to about 170 um or from about 100 um to about 400 um. In this regard, any number of particle size distributions within the above-stated ranges may be used without limitation. In other embodiments, the wear-resistant material is in the form of a wire or ribbon before being applied to the substrate by the laser cladding process.

Typically, the bead 50 will comprise a material that is more wear-resistant than the substrate 46. In some embodiments, the bead comprises a carbide (e.g., FeC, TiC, ZrC, VC, SiC, TaC, NbC, HfC, CrC, MoC or WC), nitride (e.g., TiN, ZrN, VN, BN, AlN or SiN), carbo-nitride (e.g., TiCN), borides (e.g., $TiB_2$ or $SiB_4$), titanium boride (TiB), silicon boride (SiB), aluminum oxide, diamond (including synthetic), other ceramics or any other material resistant to wear relative to the substrate. It should be noted that the list of compounds is exemplary and additional materials may be used without limitation. The wear-resistant compound may be combined with a filler material (e.g., nickel, cobalt, iron or alloys thereof) to form a matrix composed of the wear-resistant material that is applied to the substrate. The filler may improve the performance of the wear-resistant material and/or reduce material cost.

The bead 50 is generally more resistant to wear relative to the substrate 46 when used to process organic matter. The bead 50 may be harder than the substrate 46. In other embodiments, the bead 50 is characterized by a hardness similar to that of the substrate or even less than that of the substrate.

In some embodiments, the bead 50 that is fused comprises tungsten carbide. The bead 50 may comprise at least about 20 wt % tungsten carbide or, as in other embodiments, at least about 30 wt %, at least about 50 wt %, at least about 60 wt % or at least about 70 wt % (e.g., from about 20 wt % to about 80 wt %, from about 30 wt % to about 80 wt % or from about 50 wt % to about 70 wt % tungsten carbide). The remainder of the wear-resistant material may be filler. The substrate 46 may be composed of any number of materials and, in some embodiments, is carbon steel (e.g., SAE Series 41XX).

An alternative cutting tooth 126 is shown in FIG. 7. The tooth 126 has an arm portion 56 and body portion 58 for mounting to the drum. The arm portion 56 tapers as shown in FIG. 7. In other embodiments, the arm portion does not taper. The arm portion 56 has a first surface 40 and second surface 42 that form a cutting edge 45. The tooth 126 includes a wear-resistant bead 50 along the cutting edge 45.

An exemplary cutting tooth 226 is shown in FIG. 8 and another example of a tooth 326 is shown in FIG. 9. Each tooth 226, 326 includes a first surface 40 and second surface 42 that form a cutting edge 45. The teeth 226, 326 include a wear-resistant bead 50 that extends along the cutting edge 45 as described above in regard to tooth 26 (FIGS. 5 and 6).

A cutting tooth 426 that contains an opening 84 for hinging the tooth 426 to the mounting block 34 (FIG. 4) or directly to the drum 33 (FIG. 3) is shown in FIG. 10. The tooth 426 includes a first surface 40 and second surface 42 that form a cutting edge 45. The tooth 326 includes a wear-resistant bead 50 that extends along the cutting edge 45.

It should be noted that the teeth shown in FIGS. 4-10 are exemplary and other designs may be used without limitation. Generally any implement that is used to contact organic matter upon rotation that is sized and shaped for mounting on the cutting head of a propelled mulching apparatus may be considered a "cutting tooth" as used herein. Any style of cutting tooth may be used including planar, knife or hammer-style teeth.

Further the tooth may be stationary relative to the rotor assembly as shown in FIGS. 1-3 or may be hinged such as in FIG. 10 to allow for movement of the tooth relative to the rotor assembly.

EXAMPLES

The processes of the present disclosure are further illustrated by the following Examples. These Examples should not be viewed in a limiting sense.

Example 1

Wear-Resistance Testing for Mulching Apparatus with Tungsten Carbide Clad Cutting Teeth Vs. Mulching Apparatus with Teeth with No Cladding A commercially available skid-steer mulching apparatus was fitted with cutting teeth shaped similar to the tooth shown in FIG. 7. Tungsten carbide cladding was applied along the cutting surface of the teeth by use of a laser diode. The laser clad teeth operated with acceptable mulching capability for 100 hours without sharpening. Unclad teeth required sharpening after 4 hours of use and were incapable of further use after about 20 hours.

The terms "cutter" and "cut" as used herein should not imply a particular method of mulching material. Alternatively or in addition to cutting, the cutter tooth may shred, pulp, tear, slice, chop or grate the material. Furthermore it should be noted that the terms "attached," "connected" and "fused" as used herein are not intended to imply direct attachment, connection or fusion of the two respective parts and are intended to also include indirect attachment, connection or fusion such as by intermediary parts.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A cutting tooth for a mulching tool for mulching or cutting organic matter, the cutting tooth comprising:
   a substrate having a cutting edge formed on the substrate; and
   a wear-resistant bead fused to the substrate, the wear-resistant bead extending parallel along the cutting edge and having a width and a thickness, the ratio of bead width to thickness being at least about 5 to 1, the substrate and wear-resistant bead having different compositions, the wear-resistant bead being fused to the substrate by:
      activating a laser diode to generate heat and melt a wear-resistant material;
      moving at least one of the laser diode or substrate such that molten wear-resistant material is deposited parallel along the cutting edge; and
      solidifying the molten material to form a wear-resistant bead fused to the substrate parallel along the cutting edge.

2. The cutting tooth as set forth in claim 1 wherein the wear-resistant bead is fused to the substrate at the cutting edge to cover at least a portion of the cutting edge.

3. The cutting tooth as set forth in claim 1 wherein the cutting edge has a length and the wear-resistant bead extends the entire length of the cutting edge.

4. The cutting tooth as set forth in claim 1 wherein the wear-resistant bead has an average thickness of less than about 3 mm.

5. The cutting tooth as set forth in claim 1 wherein the bead includes tungsten carbide.

6. The cutting tooth as set forth in claim 1 wherein the substrate includes steel.

7. The cutting tooth as set forth in claim 1 wherein the wear-resistant bead has a width, the width being at least about 2.5 mm.

8. The cutting tooth as set forth in claim 1 wherein the wear-resistant bead has a width and a thickness, the ratio of the width to thickness being at least about 10:1.

9. The cutting tooth as set forth in claim 1 wherein the substrate includes a mounting opening for mounting the tooth on a cutting head of the mulching tool.

10. The cutting tooth as set forth in claim 1 wherein the cutting tooth has an arm portion and a body portion, the cutting edge being formed on the arm portion.

11. The cutting tooth as set forth in claim 1 wherein the tooth is sized and shaped for mounting on the cutting head of a propelled mulching apparatus.

12. A cutting head for mulching or cutting organic matter, the cutting head comprising:
    a cylindrical drum adapted for rotation about an axis; and
    one or more cutting teeth attached to the drum for shredding organic matter upon rotation of the drum, the teeth comprising:
       a substrate having a cutting edge formed on the substrate; and
       a wear-resistant bead fused to the substrate, the wear-resistant bead extending parallel along the cutting edge and having a width and a thickness, the ratio of bead width to thickness being at least about 5 to 1, the substrate and wear-resistant bead having different compositions, the wear-resistant bead being fused to the substrate by:
          activating a laser diode to generate heat and melt a wear-resistant material;
          moving at least one of the laser diode or substrate such that molten wear-resistant material is deposited parallel along the cutting edge; and
          solidifying the molten material to form a wear-resistant bead fused to the substrate parallel along the cutting edge.

13. The cutting head as set forth in claim 12 wherein the wear-resistant bead has an average thickness of less than about 3 mm.

14. The cutting head as set forth in claim 12 wherein the wear-resistant bead is fused at the cutting edge to cover at least a portion of the cutting edge.

15. The cutting head as set forth in claim 12 wherein the cutting edge has a length and the wear-resistant bead extends the entire length of the cutting edge.

16. The cutting head as set forth in claim 12 comprising a shear bar, the shear bar and cutting edge of the teeth being aligned and adjacent one another during rotation of the drum to cause organic matter to be shredded as the teeth rotate past the shear bar.

17. The cutting head as set forth in claim 12 comprising at least about 5 teeth and wherein the teeth are releasably attached to the drum.

18. A propelled apparatus for mulching or cutting organic matter, the propelled apparatus comprising:
    a propulsion mechanism; and
    the cutting head set forth in claim 12 attached to the propulsion mechanism.

19. The propelled apparatus as set forth in claim 18 wherein the propulsion mechanism is selected from the group consisting of a skid steer, excavator, backhoe, grader and dedicated prime mover.

20. The propelled apparatus as set forth in claim 18 wherein the cutting head is releasably attached to the propulsion mechanism.

\* \* \* \* \*